United States Patent [19]

Rowen

[11] 4,095,684

[45] Jun. 20, 1978

[54] FLUID OPERATED CLUTCH

[75] Inventor: Harold E. Rowen, Peoria, Ill.

[73] Assignee: Caterpillar Tractor Co., Peoria, Ill.

[21] Appl. No.: 731,881

[22] Filed: Oct. 13, 1976

[51] Int. Cl.² .................... F16D 23/10; F16D 43/24
[52] U.S. Cl. .......................... 192/103 FA; 192/103 F
[58] Field of Search .......... 192/103 FA, 103 F, 85 R, 192/85 V

[56] References Cited

U.S. PATENT DOCUMENTS

| 3,421,608 | 1/1969 | Van Gorder | 192/103 FA X |
| 3,872,956 | 3/1975 | Herr et al. | 192/103 FA X |
| 4,006,808 | 2/1977 | Starling et al. | 192/103 FA |

*Primary Examiner*—Leonard H. Gerin
*Attorney, Agent, or Firm*—Wegner, Stellman, McCord, Wiles & Wood

[57] ABSTRACT

A fluid operated clutch assemblage having axially aligned rotary input and output members, at least one axially movable disc carried by one member and at least one axially movable plate carried by the other member and an axially movable, hydraulically operated piston for causing engagement of the disc and the plate to couple the input and output members. The clutch includes a valve concentric with the input member and axially movable thereon and rotatable therewith. The valve is provided with a first pressure responsive surface and a second pressure responsive surface in bucking relation to the first pressure responsive surface. A spring biases the valve oppositely of the second pressure responsive surface and there is provided an annular, axially expandable chamber including the second pressure responsive surface rotatable with the input member. A conduit is provided for directing hydraulic fluid to the expandable chamber and a fluid conduit is utilized for directing hydraulic fluid through the input member to the piston. The valve includes a throttling port in the conduit and the first pressure responsive surface is in fluid communication with the conduit between the piston and the throttling port. As a consequence, the degree of coupling is dependent upon the rotational input rate and the amount of fluid in the expandable chamber with the valve serving as an amplifier in the system.

9 Claims, 2 Drawing Figures

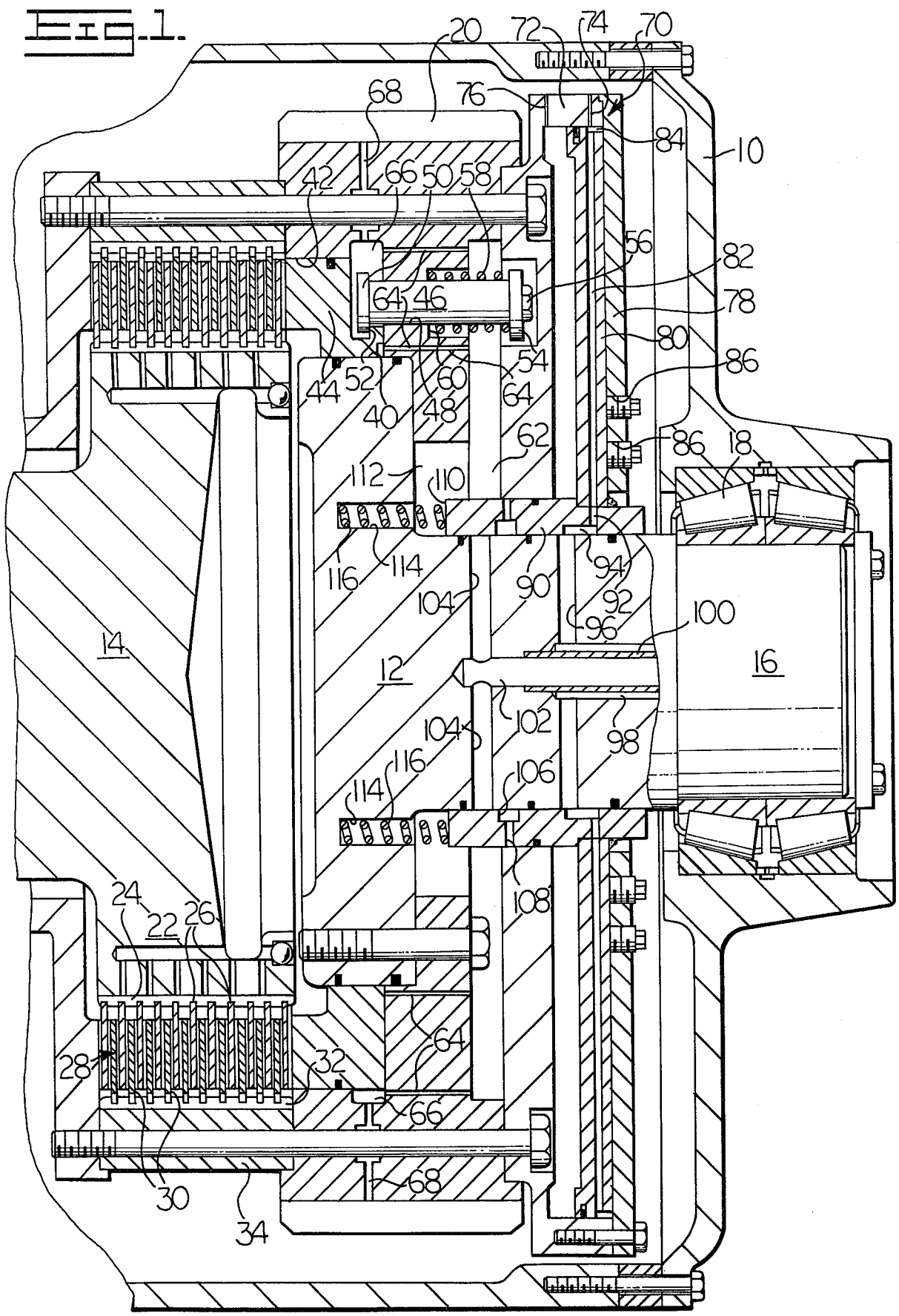

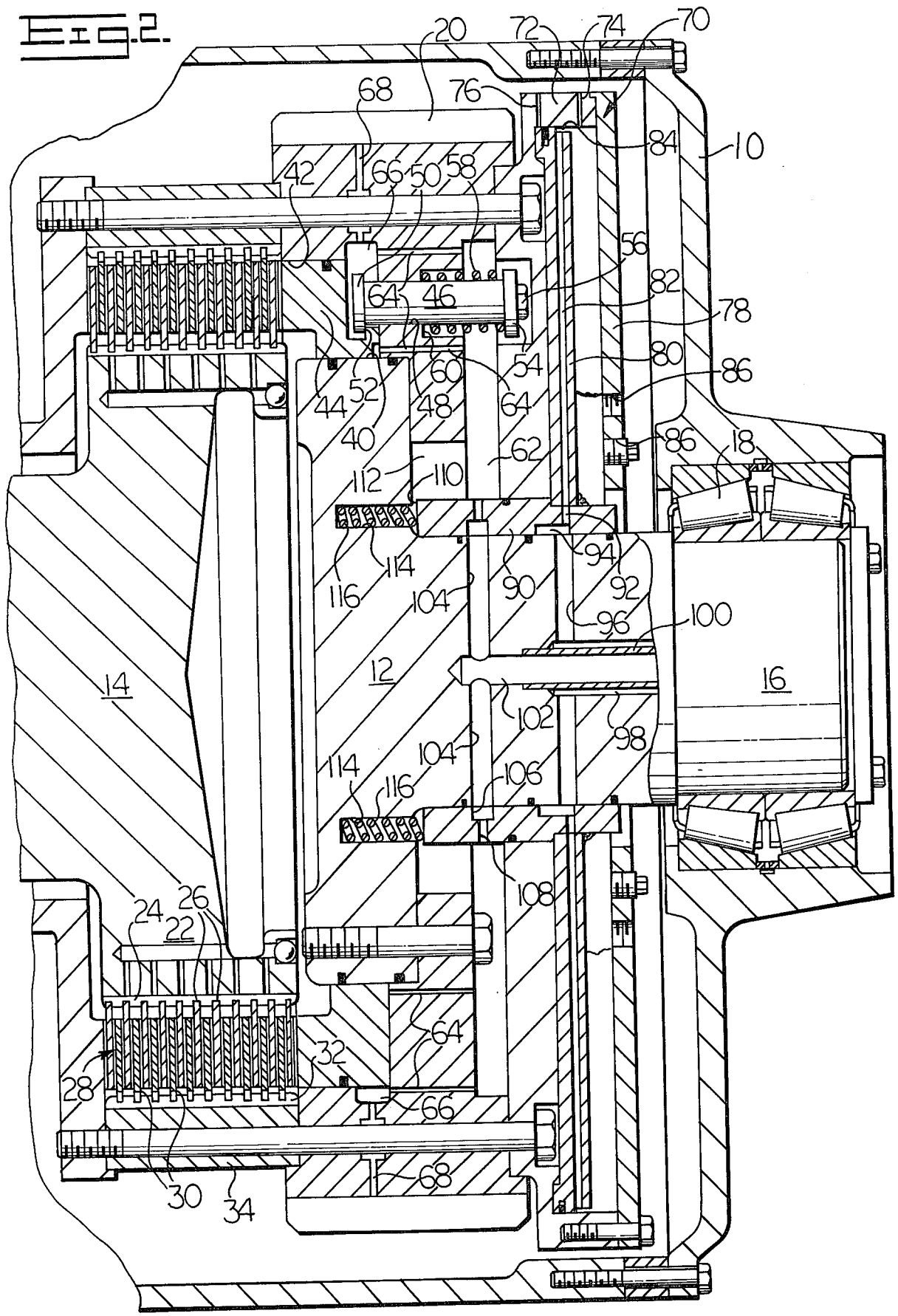

– 1 –

FLUID OPERATED CLUTCH

BACKGROUND OF THE INVENTION

This invention relates to fluid operated clutches wherein clutch capacity is proportional to input speed.

Prior art of possible relevance includes U.S. Letters Pat. Nos. 3,831,726 to Woody et al, issued Aug. 27, 1974; 3,863,746 to Schulz, issued Feb. 4, 1975; and 3,872,956 to Herr et al, issued Mar. 25, 1975.

Fluid operated clutches of the type wherein a centrifugal head on a rotating column of hydraulic fluid is utilized to force a piston against a clutch pack and engage the clutch have been of significant value in marine propulsion systems. One of the main advantages of such clutches is the fact that clutch capacity is related to input or engine speed. This feature ensures against propulsion engine reversal caused by propeller inertia feedback through a fully engaged reverse clutch.

With conventional clutches, the capacity at a set control pressure is constant and totally independent off engine speed. If the engine for the load is throttled back and the selector valve reversed, engine reversal will occur. Propeller inertia feeds torque back through the clutch at some value and due to its set capacity, the clutch will carry the torque back to the engine which, at a low speed, will have a low torque output. As a consequence, the engine cannot carry the feed back torque and is forced into reverse rotation.

In the case of fluid operated clutches of the type mentioned above, the clutch capacity is related to input or engine speed and can be set so that the capacity is always less than available engine torque at any given engine speed. As a consequence, propeller inertia feedback cannot occur, thereby allowing the elimination of the usual propeller shaft brake.

Heretofore, however, such clutches have not been susceptible to universal use in that the capacity is limited by available rotational speed and clutch diameter. Therefore, they cannot be utilized with transmissions of various sizes or having various output speeds.

SUMMARY OF THE INVENTION

It is the principal object of the invention to provide a new and improved fluid operated clutch. More specifically, it is an object of the invention to provide such a clutch wherein the same can be utilized successfully on a large variety of transmissions and with transmissions having dramatically different speed characteristics.

An exemplary embodiment of the invention achieves the foregoing object in a structure including a rotary input member, a rotary output shaft axially aligned with the rotary input member and a pack of interleaved clutch discs, alternate ones of which being carried by and rotatable with the input member, the other of the discs being carried by and rotatable with the output shaft. The discs are axially shiftable and an actuator is carried by the input member in axial alignment with the pack and is operable, when actuated, to compress the pack to engage the discs and thereby couple the input and output members. Means are provided to define an annular, expandable chamber carried by the input member and the chamber includes an axially shiftable wall. Means are provided for supplying a liquid to the interior of the chamber and there is further provided a means responsive to the force applied to the wall for applying force to the actuator. The force applying means includes a force amplifier operatively interposed between the wall and the actuator so that a greater force is applied to the actuator than is applied to the wall whereby the clutch capacity is increased.

In a highly preferred embodiment, the force amplifier includes a force amplifying hydraulic circuit. The force amplifying hydraulic circuit includes a valve concentric with the input member and axially movable thereon. The valve includes a pressure responsive surface and the shiftable wall is mounted on the valve to be located in bucking relation to the pressure responsive surface thereon. Means are provided for biasing the valve oppositely of the wall. The valve includes a throttling port and means are provided for directing hydraulic fluid through the valve to the actuator which, in the preferred embodiment, comprises a hydraulic piston. The pressure responsive surface is in fluid communication with the hydraulic circuit so as to be responsive to the pressure applied to the piston.

Relatively low pressures may be utilized to introduce fluid at varying rates into the expandable chamber whereas relatively high pressures may be directed to the piston through the throttling valve so that the throttling valve, in connection with the provision of highly pressurized fluid, provides the force amplification.

In a highly preferred embodiment, means are provided for selectively adjusting the fluid retaining volume of the chamber.

Other objects and advantages will become apparent from the following specification taken in connection with the accompanying drawings.

DESCRIPTION OF THE DRAWINGS

FIG. 1 is a sectional view of a fluid operated clutch made according to the invention with the components in a disengaged configuration; and FIG. 2 is a view similar to FIG. 1 illustrating the clutch components in a fully engaged configuration.

DESCRIPTION OF THE PREFERRED EMBODIMENT

An exemplary embodiment of a fluid operated clutch made according to the invention is seen in the drawings and includes a housing 10 containing a rotary input member 12 and a rotary output shaft 14 which is axially aligned with the rotary input member 12. The rotary input member 12 includes a reduced diameter shaft 16 which is journalled by bearings 18 within the housing. Other bearings (not shown) journal the output shaft 14 as well as components of the rotary input member 12 to the left of the showing of FIG. 1.

The radially outer extremity of the rotary input member 12 is provided with gear teeth 20 which may be driven by the output of a transmission coupled to a propulsion source.

The output shaft 14 includes an enlarged diameter portion 22 having radially outwardly directed splines 24 about its periphery. Alternate ones 26 of a pack 28 of clutch discs are received on the splines 24 to be carried by the output shaft 14 and to be axially movable thereon. The others 30 of the disc pack 28 are similarly carried by radially inwardly directed splines 32 on the interior of a ring 34 forming part of the rotary input member 12. The discs 30 carried by the rotary input member 12 are also shiftable such that when the pack 28 is compressed, as seen in FIG. 2, full coupling between the input member 12 and the output shaft 14 will occur, while when uncompressed, as illustrated in FIG. 1, slippage between the discs 26 and 30 will occur, decoupling the input and output members.

The input member 12 includes a radially inner, cylindrical surface 40 provided with seals, as indicated, and a radially outer cylindrical surface 42 concentric with the surface 40 to define an annulus aligned with the disc pack 26. Within the annulus thus defined is an annular piston 44 which is axially movable to bear against the endmost one of the discs in the pack 28 to compress the pack to couple the components. At various circumferential positions, only one of which is shown, there are provided rods 46 slidably received in bores 48 in the input member 12 radially outwardly from its axis. The rods 46 have enlarged ends 50 in engagement with lips 52 formed on the side of the piston 44 opposite from the disc pack 28. The rods 46, at their ends opposite the ends 50, receive washers 54 retained in place by bolts 56 which capture biasing springs 58. The biasing springs 58 also bear against a shoulder 60 concentric with the bore 48. As a consequence, the piston 44 will be biased to the right, as viewed in the drawings, the biasing force being such as to tend to disengage the discs of the disc pack 28.

The input member also includes an annular chamber 62 adapted to receive hydraulic fluid under pressure. Axial ports 64 extend to an annular 67 adjacent the side of the piston 44 opposite from the disc pack 28 with the result that hydraulic fluid under pressure, when directed to the chamber 62, will be applied to the piston 44 to drive the same, against the bias of the springs 58, to the left, as viewed in the Figures, to engage the discs of the clutch pack 28. As a consequence, the capacity of the clutch will be dependent upon the amount of force applied to the pack 28 by the piston 44 which, in turn, will be governed by the pressure of the hydraulic fluid applied to the piston and the oppositely directed biasing force provided by the springs 58.

Bleed conduits 68 extend radially outwardly from the annulus 66 for the purpose of bleeding off hydraulic fluid to (a) allow the piston 44 to return to the position illustrated in FIG. 1 when hydraulic fluid under pressure is not being applied to the piston, and (b) prevent an undesired pressure buildup behind the piston 44 when hydraulic fluid under pressure is being applied to the same from a source at a greater pressure than the pressure desired to be applied to the piston 44, as will become more apparent hereinafter.

The input member 12 also carries an annular, expandable chamber, generally designated 70. The chamber 70 includes a radially outer cylindrical wall 72 provided with bleed passages 74 and 76. The chamber 70 also includes a radially extending, fixed wall 78 and a radially extending, axially movable wall 80. Hydraulic fluid may be introduced into the space between the walls 78 and 80 through radially extending conduits 82 in wall 80 which terminate in axially extending conduits 84 directed towards the wall 78. When hydraulic fluid is so directed, by means to be described in greater detail hereinafter, and the input member 12 is being rotated, a centrifugal head is generated on the resulting rotating column of hydraulic fluid which is torus shaped. The head thus produced will tend to drive the axially shiftable wall 80 to the left, as viewed in FIG. 1. The degree of force applied to the wall 80 by the rotating torus of hydraulic fluid will be dependent upon the rate of rotation as well as the quantity of hydraulic fluid in the chamber.

To establish a maximum capacity of the chamber 70, the fixed wall 78 is provided with a series of radially spaced bores 86 which may be selectively plugged, as illustrated. When the capacity of the chamber 70 is desired to be relatively great, the radially outer ones of the bores 86 will be plugged. Conversely, when a minimal capacity of the chamber 70 is desired, a selected, relatively radially outer one of the bores 86 will be unplugged. As illustrated, the bores 86 may be angularly spaced about the wall 78.

The bleed passage 76 is provided to allow hydraulic fluid under pressure leaking past the movable wall 80 to escape to eliminate any back pressure against the wall 80 as it is forced to the left. The bleed passages 74 provide for a controlled rate of bleed from the interior of the expandable chamber so as to prevent a pressure buildup therein in the event the supply pressure to the chamber is greater than the desired pressure generated within the chamber by the centrifugal head. The bleed passages 74 also permit the escape of hydraulic fluid from the interior of the chamber 70 when hydraulic fluid is not being directed to the interior thereof.

The axially shiftable wall 80 of the chamber 70 is mounted on one end of a sleeve valve 90 which is axially shiftable on the reduced diameter shaft 16 of the input member 12. The valve 90 includes radially directed passages 92 in fluid communication with the passages 82 in the wall 80 and with an inwardly opening annulus 94 which is in fluid communication with radially extending conduits 96 in the reduced diameter shaft 16. The conduits 96 extend radially inwardly to an axial passage 98 which is adapted to be connected by any suitable means (not shown) to a source of hydraulic fluid under relatively low pressure and of the type wherein the pressure applied can be suitably modulated to provide a control function. As can be ascertained from a comparison of FIGS. 1 and 2, the dimensioning of conduits 96 and the annulus 94 is such that fluid communication between the passages 82 and the axially extending conduit 98 is never impeded.

A tube 100 is disposed within the passage 98 and isolated therefrom. The tube 100 may be connected, by any suitable means, to a source of hydraulic fluid under relatively high pressure, which pressure may be constant. The tube 100 establishes fluid communication with an axially extending bore 102 which terminates in radially extending conduits 104 which terminate at the periphery of the reduced diameter shaft 16.

The valve 90 includes a second annulus 106 with conduits 108 extending radially therefrom whereby, when the valve 90 is shifted to the left, as viewed in FIG. 1, to assume, for example, the position illustrated in FIG. 2, fluid communication to the chamber 62, and thus to the piston 44, is established. The annulus 106 serves as a throttling port to control the flow of high pressure hydraulic fluid to the piston proportional to the position of the valve 90 axially on the shaft 16. The further the valve 90 is shifted to the left, as viewed in the Figures, the less throttling action will be provided by the edge of the annulus 106, thereby allowing increased fluid flow.

The valve 90 has a pressure responsive surface 110 on the end thereof opposite from the movable wall 80 and which, by means of an annulus 112 in fluid communication with the chammber 62, is responive to the pressure applied to the piston 44 and is in bucking relation to the pressure responsive surface provided by the right-hand side of the movable wall 80. Angularly spaced bores 114 are located to the left of the valve 90, as viewed in the Figures, and receive biasing springs 116 which act against the surface 110 in concert with the same to normally urge the valve 90 toward the right, as viewed in the Figures, to a location whereat the annulus 106 is not aligned with the conduits 104, halting the flow of hydraulic fluid to the piston 44.

It is to be noted that the provision of a high pressure source in fluid communication with the conduit 102 in connection with the relatively small surface 110 on the valve and the relatively large, bucking surface on the wall 80 provides a force amplifier with the smaller the effective area of the surface 110 in comparison to that of the wall 80, the greater the amplification of the force involved.

In operation, a modulated flow of hydraulic fluid is directed to the interior of the expandable chamber 70 via the conduits 98, 96, annulus 94, and conduits 82 and 84. As a result of rotation of the input member 12, a centrifugal head will be generated within the chamber 70 to urge the wall 82 to the left, as viewed in FIG. 1. This will cause a commensurate shifting of the valve 90 to the left to the point where fluid communication from the conduits 104 to the chamber 62, and thus to the piston 44, is established. The pressure of fluid will act against the surface 110 in bucking relation to the force applied to the wall 80. A balance will be established and the compressive force applied to the disc pack 28, and thus the capacity of the clutch, will be dependent upon the pressure at which balance is achieved. If input speed is increased, the force of the centrifugal head will increase and cause further movement of the valve 90 to the left, thereby further opening the throttling port provided by the annulus 96 to increase the flow of hydraulic fluid under pressure to the piston 44 to further increase the compressive force applied to the clutch pack. Conversely, if rotation speed of the input member 12 is decreased, the force generated by the centrifugal head of fluid will decrease with the result that the spring 114 will shift the valve 90 to the right thereby throttling the flow of hydraulic fluid to the piston 44 to reduce the pressure of fluid applied thereto and thereby decrease the pressure applied to the clutch pack 28 and decrease the clutch capacity. Consequently, clutch capacity can be matched to available input torque, as alluded to previously. The bleed passages 68 and 74 allow fluid flow at all times to thereby provide pressure control. By opening desired ones of the ports 86, the maximum capacity of the expandable chamber can be suitably varied to set the maximum capacity of the clutch.

It will be appreciated that the force amplification provided by the use of the valve 90 does not limit the application of force applied to the clutch pack 28 to that generated within the expandable chamber 70. In previous constructions, such was a limitation and, where greater capacities were desired, it was necessary to increase the capacity of the chamber. As a consequence, size of the unit had to necessarily be varied dependent upon the particular installation in which the clutch was to be used.

At the same time, the present invention solves problems associated with differing speeds employed in differing systems. For example, if it be assumed that the embodiment illustrated was optimally used in an installation having a maximum input of 1,200 rpm, the same clutch capacity could be obtained in an application utilizing an 1,800 rpm input without varying the geometry of the chamber 70 simply by decreasing the capacity of the chamber 70 by unplugging a desired one of the bores 86 at the desired radius.

From the foregoing, it will be appreciated that a fluid operated clutch made according to the invention is ideally suited for use in a wide variety of applications.

What is claimed is:

1. In a fluid operated clutch assemblage having axially aligned rotary input and output members, at least one axially movable disc carried by one member, at least one axially movable plate carried by the other member and an axially movable, hydraulically operated piston for causing engagement of said disc(s) and plate(s), the combination of:
    a valve concentric with said input member and axially movable thereon and rotatable therewith;
    a first pressure responsive surface on said valve;
    a second pressure responsive surface on said valve in bucking relation to said first pressure responsive surface;
    biasing means acting upon said valve oppositely of said second pressure responsive surface;
    means, including said second pressure responsive surface, defining an annular, axially expandable chamber, rotatable with said input member;
    means for directing hydraulic fluid to said expandable chamber; and
    a fluid conduit for directing hydraulic fluid through said input member to said piston;
    said valve including a throttling port in said conduit; and
    said first pressure responsive surface being in fluid communication with said conduit between said piston and said throttling port.

2. The fluid operated clutch of claim 1 further including means for selectively adjusting the fluid retaining volume of said chamber.

3. A fluid operated clutch comprising:
    a rotary input member;
    a rotary output shaft axially aligned with said input member;
    a pack of interleaved clutch discs, some carried by said input member and others carried by said shaft;
    a piston carried by said input member and axially movable relative thereof to compress said pack;
    a valve concentric with a portion of said input member to be rotatable therewith and axially shiftable thereon;
    means defining an expandable chamber carried by said input member and including means for axially shifting said valve in response to changes in volume of said chamber;
    means for introducing a liquid into said chamber;
    a throttling port in said valve;
    means for directing an actuating fluid to said valve throttling port;
    a conduit in said input member extending from said valve to said piston; and
    means responsive to fluid pressure applied to said piston for applying a collapsing force to said chamber.

4. A fluid operated clutch comprising:
    a rotary input member;
    a rotary output shaft axially aligned with said input member;
    a pack of interleaved clutch discs, some carried by said input member and others carried by said shaft;

a piston carried by said input member and axially movable relative thereto to compress said pack;

a valve concentric with a portion of said input member to be rotatable therewith and axially shiftable thereon;

means responsive to the angular velocity of said input member for applying a proportional shifting force to said valve;

a throttling port in said valve;

means for directing an actuating fluid through said valve throttling port to said piston; and means responsive to fluid pressure applied to said piston for applying a shifting force to said valve in opposition to said angular velocity responsive means.

5. The fluid operated clutch of claim 4 further including spring biasing means for applying a shifting force to said valve in concert with said fluid pressure responsive means.

6. A fluid operated clutch comprising:
a rotary input member including a reduced diameter shaft;
a rotary output shaft axially aligned with said rotary input member;
a pack of interleaved clutch discs, alternate ones of which are carried by and rotatable with said input member, the others of said discs being carried by and rotatable with said output shaft, substantially all of said discs being axially shiftable;
an annular piston carried by said input member in axial alignment with said pack and operable, upon the application of fluid under pressure thereto, to compress said pack to engage said discs;
means for biasing said piston away from said pack;
an axially expandable chamber mounted on said input member for rotation therewith, including an axially shiftable, annular wall;
a sleeve valve concentric with said reduced diameter shaft and axially movable thereon, said sleeve valve being secured to said wall whereby changes in volume of said chamber causing shifting of said wall will axially shift said valve;
a throttling port in said valve;
a first conduit in said input member and in continuous fluid communication with the interior of said expandable chamber;
a second conduit in said input member and adapted to be connected to a source of fluid under pressure extending to said throttling port;
a third conduit in said input member extending from said port to said piston;
a pressure responsive surface on said valve in bucking relation to said wall and responsive to fluid under pressure applied to said piston; and
biasing means applying an axial bias to said valve in concert with said pressure responsive valve.

7. The fluid operated clutch of claim 6 wherein said expandable chamber includes an additional, fixed, radially extending wall; and a plurality of radially spaced, selectively openable fluid ports in said fixed wall.

8. The fluid operated clutch of claim 6 wherein said pressure responsive surface is on an end of said valve and wherein said first and second conduits include concentric portions extending axially along the axis of said reduced diameter shaft.

9. A fluid operated clutch comprising:
a rotary input member;
a rotary output shaft axially aligned with said rotary input member;
a pack of interleaved clutch discs, alternate ones of which being carried by and rotatable with said input member, the others of said discs being carried by and rotatable with said output shaft, substantially all of said discs being axially shiftable;
an actuator carried by said input member in axial alignment with said pack and operable, when actuated, to compress said pack to engage said discs;
means defining an annular, expandable chamber carried by said input member, said chamber including an axially shiftable wall;
means for supplying a liquid to the interior of the chamber; and
means responsive to the force applied to said wall for applying a force to said actuator, said responsive means including a force amplifier operatively interposed between said wall and said actuator so that a greater force is applied to said actuator than is applied to said wall.

* * * * *